Feb. 6, 1962  A. J. SHELBY  3,019,830
ADJUSTABLE SNOW AND MUD LUG FOR VEHICLE TIRES
Filed April 29, 1960  3 Sheets-Sheet 1

Albert J. Shelby
INVENTOR.

BY *Clarence A. O'Brien*
*and Harvey B. Jacobson*
Attorneys

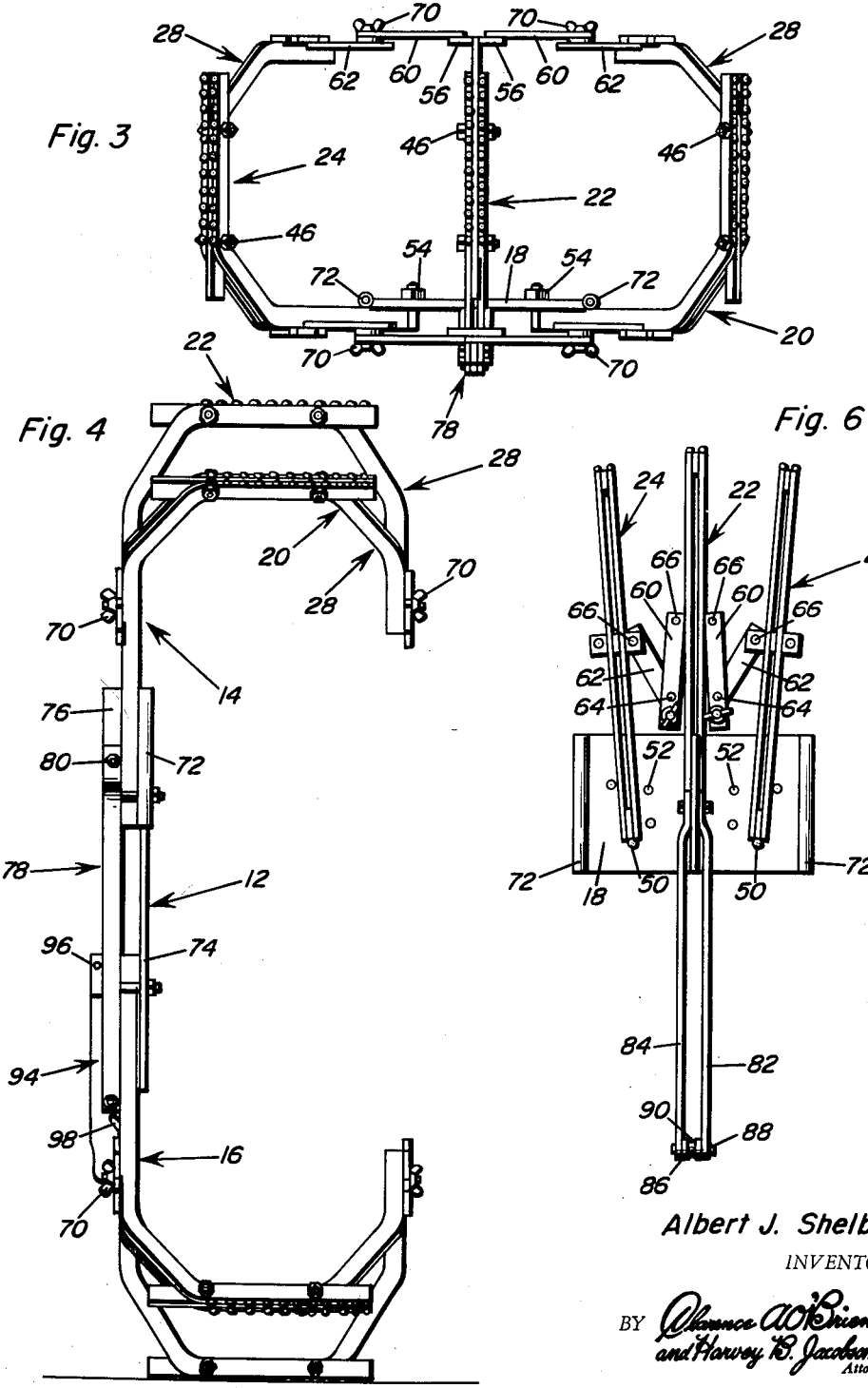

Feb. 6, 1962  A. J. SHELBY  3,019,830
ADJUSTABLE SNOW AND MUD LUG FOR VEHICLE TIRES
Filed April 29, 1960  3 Sheets-Sheet 3
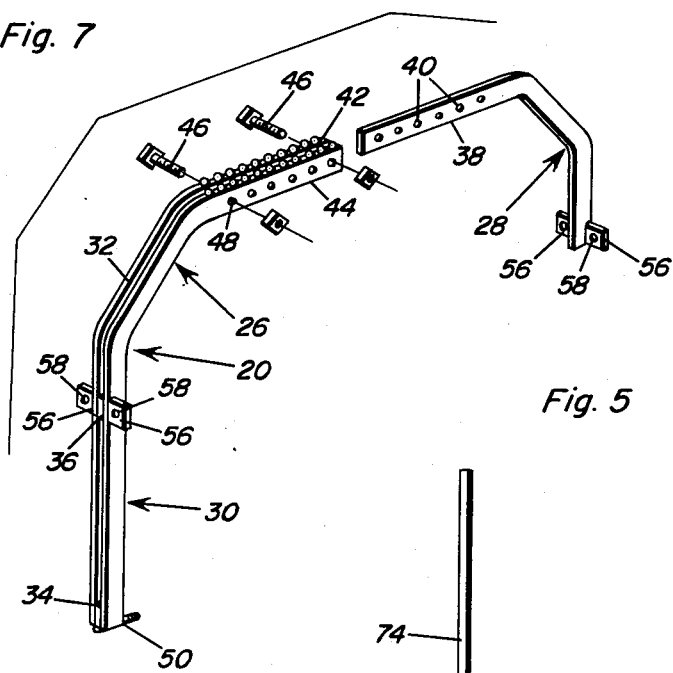
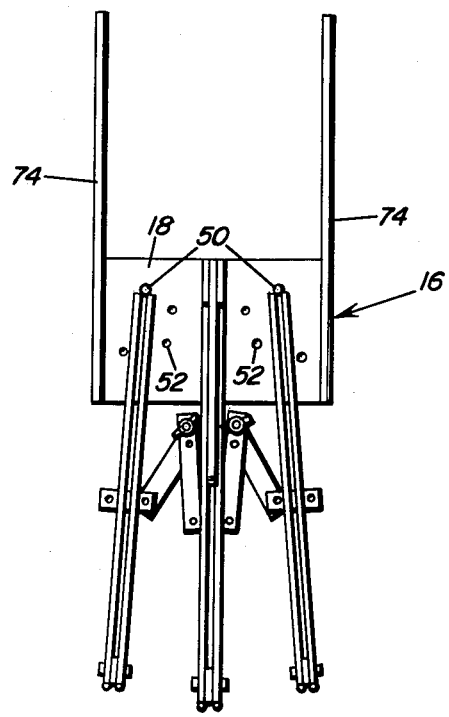
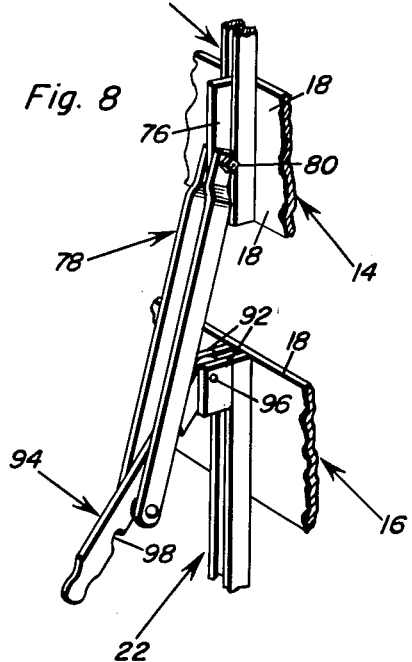
Albert J. Shelby
INVENTOR.

United States Patent Office 3,019,830
Patented Feb. 6, 1962

3,019,830
ADJUSTABLE SNOW AND MUD LUG FOR
VEHICLE TIRES
Albert J. Shelby, 3023 Sheridan Road, Lennon, Mich.
Filed Apr. 29, 1960, Ser. No. 25,647
8 Claims. (Cl. 152—225)

This invention relates to a novel and useful traction device, and more particularly to a traction device which is specifically adapted to be secured to a vehicle tire from one side thereof. Further, the traction device of the instant invention is specifically designed to be readily adapted to vehicle tires of varying dimensions, the traction device including the provision of a pair of generally J-shaped opposed traction members adapted to embrace diametrically opposite portions of a vehicle tire, the effective length of the bight portions of the J-shaped members being adjustable to compensate for tires of different widths and the traction device being provided with means for adjustably positioning the bight portions of the J-shaped members toward and away from each other for compensating for vehicle tires of different diameters.

Numerous types of traction devices for use on vehicle tires have been heretofore designed, but most of these have not been specifically adapted for securement to a vehicle tire from one side thereof without some sort of securing means being at least temporarily secured to the vehicle tire for retaining the traction device in position thereon. Further, most traction devices heretofore have not provided a means for readily adapting the traction devices for tires of varying dimensions as to their diameter and width.

Each of the generally J-shaped opposed traction members of the instant invention includes a plurality of generally U-shaped members disposed in side-by-side relation. Corresponding U-shaped members each have the free end portion of one leg secured to a mounting plate with one of the legs pivotally secured thereto. The axis of rotation of the one U-shaped member extends between the free end portions of its legs so that the bight portions of the U-shaped members are mounted for movement toward and away from each other. In this manner, two or three or more U-shaped members may be secured to each of the mounting plates, and in the case of three U-shaped members being used, the middle U-shaped member has the free end portion of one of its legs fixedly secured to the mounting plate while the corresponding free end portions of the legs of the other U-shaped members are pivotally secured to the plate for movement about axes extending between the free end portions of their legs. Suitable interconnecting means is secured between corresponding legs of the U-shaped members adjacent their bight portions for limiting movement of the bight portions away from each other and securing the U-shaped members in "extended positions." With the U-shaped members of each of the J-shaped members disposed in extended positions, the J-shaped members may then be drawn toward each other to frictionally engage each of the U-shaped members with a portion of the circumference of the tire to which the traction device is secured. The interconnecting means secured between corresponding legs of the U-shaped members may be made rigid to secure the U-shaped members in extended positions and the mounting plate for each set of U-shaped members includes means for adjustably positioning the axis of rotation of the U-shaped members pivotally secured thereto whereby the axis of rotation of each of the U-shaped members pivoted thereto may be positioned substantially upon a radius of the wheel or tire to which the traction device is secured. In this manner, the traction of each of the U-shaped members is evenly distributed throughout the mounting plate.

The main object of this invention is to provide a traction device capable of being quickly and securely affixed to a vehicle tire from one side thereof without the use of separate fastening means carried by the vehicle tire for securement by the traction device.

A further object of this invention, in accordance with the preceding object, is to provide a traction device which will readily adapt itself to vehicle tires of varying thickness.

Yet another object of this invention, in accordance with the preceding objects, is to provide a traction device which will readily adapt itself to vehicle tires of varying diameters.

Another object of this invention is to provide a traction device which may be applied to a vehicle tire from one side thereof while having less than one-fourth of the tire accessible due to concealing body members or fender skirts and the like.

A final object to be specifically enumerated herein is to provide a traction device which will conform to conventional forms of manufacture, be of simple construction and easy to apply so as to provide a device that will be economically feasible, long lasting, and operable by substantially every person capable of operating a vehicle.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 3 is a top plan view of the traction device illustrated in FIGURE 1;

FIGURE 4 is an end elevational view of the traction device illustrated in FIGURE 1;

FIGURES 5 and 6 are side elevational view of the two half sections of the traction device shown in a collapsed state;

FIGURE 7 is an exploded perspective view of one of the U-shaped members comprising a part of one-half of the traction device; and FIGURE 8 is a fragmentary enlarged perspective view of the adjustable inner connecting means secured between the two half sections of the traction device for urging the half sections together to secure the latter in frictional embracing relation to diametrially opposite portions of a vehicle tire.

Figure 1:
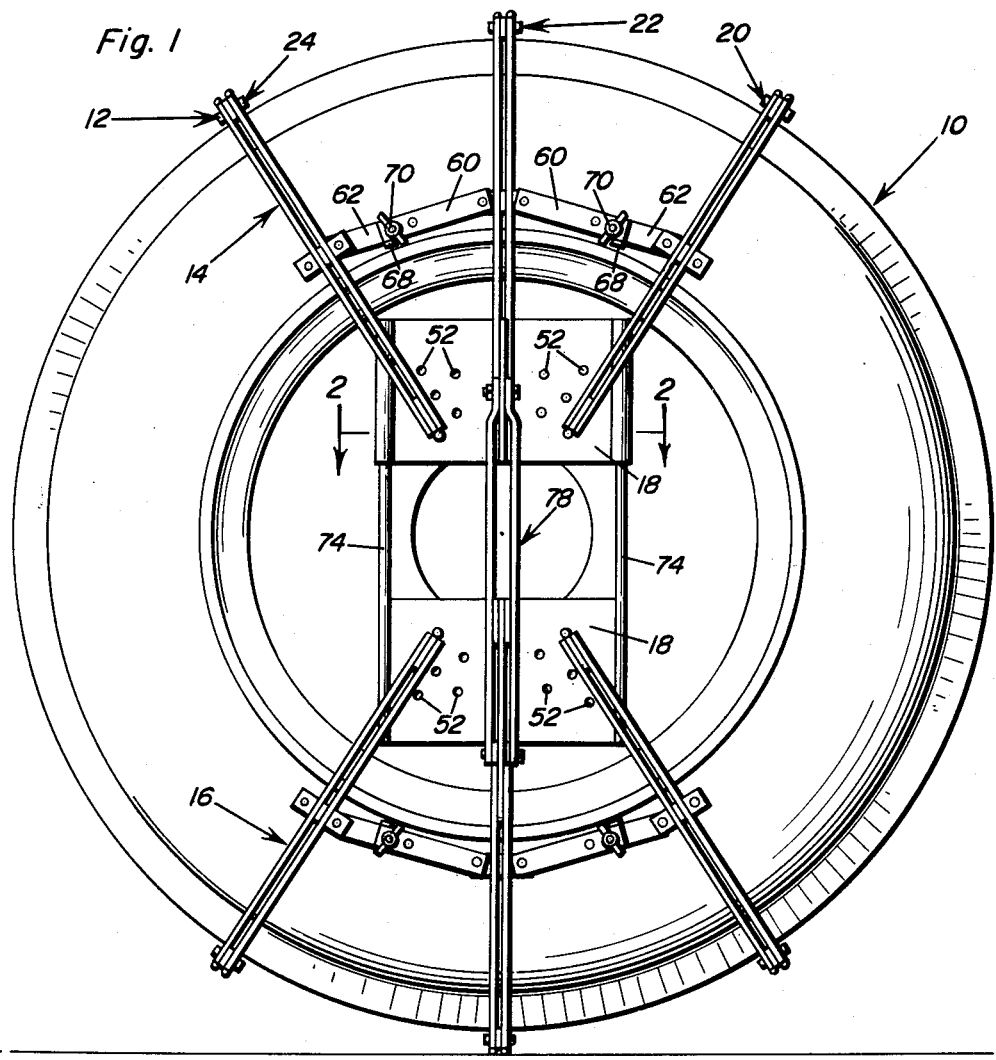
FIGURE 1 is a side elevational view of a conventional form of vehicle tire shown with the traction device of the instant invention secured thereto.

Referring now more specifically to the drawings, the numeral 10 generally designates a conventional form of vehicle tire which is shown in FIGURE 1 of the drawings with the traction device generally designated by the reference numeral 12 secured thereto.

The traction device 12 includes a pair of generally J-shaped half sections generally designated by the reference numerals 14 and 16. Each of the half sections 14 and 16 is substantially similar in construction, and therefore only the J-shaped member 14 will herein be specifically described.

The J-shaped member 14 includes a mounting plate 18 and a plurality of generally U-shaped traction members generally designated by the reference numerals 20, 22 and 24. It will be noted that each of the U-shaped members 20, 22 and 24 includes a pair of generally L-shaped arms generally designated by the reference numerals 26 and 28, see FIGURE 7. The L-shaped arm 26 includes a pair of L-shaped members 30 and 32 which have spacer blocks 34 and 36 secured therebetween to retain the members 30 and 32 in spaced relation. The leg 38 of the L-shaped member 28 comprising a portion of the bight portion of the U-shaped member 20 is suitably apertured, as at 40, and is substantially the same thickness as the spacer blocks 34 and 36. The leg 38 is received between the legs 42 and 44 of the L-shaped member 26 and suitable fasteners 46 are secured through the aligned apertures 48 formed in the legs 42 and 44 and the apertures 49 formed in the leg 38 to secure the L-shaped members 26 and 28 together. It will be noted that the opposite leg portions of the U-shaped member 20 may be spaced apart as desired to conform to the width of the vehicle tire 10 by properly adjusting the overlap of the leg 38 and the legs 42 and 44 by means of fasteners 46.

Figure 2:
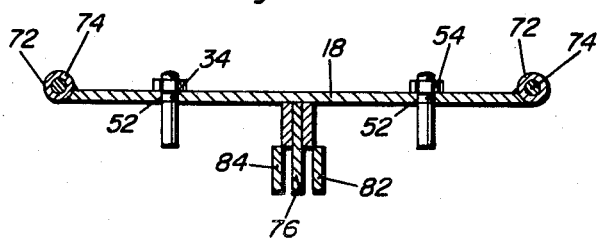
FIGURE 2 is an enlarged horizontal sectional view taken substantially upon the plane indicated by the section line 2—2 of FIGURE 1.

One leg of the U-shaped member 22 is fixedly secured to the mounting plate 18 in any convenient manner and a threaded pivot pin 50 is secured to the free end portion of the corresponding legs of the U-shaped members 20 and 24 for securing those U-shaped portions to the mounting plate 18 by means of apertures 52 formed therein and threaded fasteners 54, see FIGURES 2 and 6. In this manner, the U-shaped members 20 and 24 are pivotally secured to the plate 18 for movement about axes extending between the free end portions of the legs of each so that the U-shaped members 20 and 24 may be pivoted from a collapsed position illustrated in FIGURE 6 of the drawings to an extended position illustrated in FIGURE 1 of the drawings.

It will be noted from FIGURE 7 of the drawing that U-shaped members 20, 22 and 24 are provided with laterally projecting lugs which are each apertured as at 58. A pair of links 60 and 62 have their adjacent ends pivotally secured together by means of pivot pin 64 and their remote ends pivotally secured between adjacent lugs 56 of adjacent U-shaped members by means of pivot pins 66, see FIGURE 6. In this manner, adjacent U-shaped members are secured together and the links 60 and 62 disposed between adjacent U-shaped members limit the pivotal movement of those members away from each other.

With particular attention directed to FIGURE 1 of the drawings, it will be noted that each of the links 60 is provided with a laterally projecting stop lug 68 for limiting the pivotal movement of the links 60 and 62 relative to each other in one direction to a position with the links 60 and 62 aligned. A retaining screw 70 is threadedly engaged in a threaded bore formed in the links 60 and may be manipulated to frictionally engage the link 62 disposed therebeneath to retain the links 60 and 62 in aligned positions with the corresponding U-shaped members in extended positions. If it is desired, the link 62 may be provided with a suitable aperture for receiving that portion of the threaded fastener 70 projecting through the corresponding link 60.

It is to be noted, see FIGURES 3 and 4 in particular, that the L-shaped members 28 are also provided with interconnecting links 60 and 62.

With attention now directed to FIGURES 1, 5 and 6, it will be noted that one of the plates 18 is provided with a pair of tubular guide members 72 on its opposite end portions and that the other plate 18 is provided with a pair of cylindrical rods 74 on its opposite end portions. It will be noted that the rods 74 are slidably received in the tubular guide members 72. In this manner, the J-shaped members 14 and 16 are slidably secured to each other for movement towards and away from each other.

With particular attention directed to FIGURE 8 of the drawings, it will be noted that the U-shaped member 22 carried by the J-shaped member 14 has a somewhat larger spacer 76 secured between its legs adjacent the plate 18. This spacer element or member projects from the plate 18 and has a generally U-shaped actuating lever, generally referred to by the reference numeral 78 pivotally secured thereto by means of pivot pin 80. The U-shaped member 78, see also FIGURE 6, includes a pair of legs 82 and 84 having a roller 86 journaled between the ends thereof remote from the pivot pin 80 by means of pivot pin 88. The roller 86 is provided with a diametrically reduced midportion 90 whose purpose will be hereinafter more fully set forth.

The U-shaped member 22 of the J-shaped member 16 has a pair of apertured lugs 92 secured to the free end of its leg secured to the plate 18, see FIGURE 8, and a lever arm, generally designated by the reference numeral 94, is pivotally secured between the lugs 92 by means of a pivot pin 96. The lever arm 94 is provided with a plurality of notches 98 for engagement with the diametrically reduced portion 90 of the roller 86.

It may be observed from FIGURE 8 of the drawings that the lever arm 94 is disposed between the legs 82 and 84 with a selected notch 98 engaged with the diametrically reduced portion 90 of the roller 86 in order to apply the traction device 12 to the tire 10. As the lever arm 94 is pivoted to a position abutting the corresponding U-shaped member 22, the J-shaped member 14 is drawn toward the J-shaped member 16, thus causing the U-shaped members 20, 22 and 24 of the J-shaped members 14 and 16 to frictionally and embracingly engage diametrically opposite portions of the tire 10.

It will be noted that each of the plates 18 is provided with a plurality of apertures 52. The pivot pins 50 of the U-shaped members 20 and 24 may be positioned in a selected aperture 52 in order to place each of the pivot pins 50 in a position lying substantially along a radius of the tire 10. In this manner, each of the U-shaped members 20, 22 and 24 of the J-shaped members 14 and 16 will have the traction afforded thereby equally distributed to the traction device 12. Of course, it is to be noted that the notch 98 in which the diametrically reduced portion 90 of the roller 86 is engaged determines the distance between the bight portions of the J-shaped members 14 and 16, and therefore that the traction device 12 may be adjusted for tires 10 of different diameters by selecting different notches 98 to be engaged with the roller 86.

By securing the J-shaped members 14 and 16 together in a telescoping manner, first one of the J-shaped members may be positioned on a tire through a restricted access opening and then rotated to a position substantially diametrically opposite that limited access opening. The other J-shaped member may then be engaged with the tire through the limited access opening and the two J-shaped members may then be secured together in the manner heretofore set forth. By constructing the traction device 12 in this manner, it may be secured to vehicle tires substantially enclosed by body portions of the vehicle by which it is carried.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adjustable traction device for vehicle tires comprising a pair of generally J-shaped opposed traction members adapted to embrace diametrically opposite portions of a vehicle tire with the free ends of the longer leg portions thereof disposed on one side of a tire and projecting toward each other, adjustable and coacting securing means on said longer leg portions interconnecting the latter for moving the free end portions of said J-shaped members toward each other to frictionally embrace diametrically opposite portions of a tire, each of said J-shaped members including at least three generally U-shaped members, a mounting plate, means fixedly securing one free end portion of the center U-shaped member to said plate, and means pivotally securing the corresponding end portion of each of the other U-shaped members to said plate for movement about an axis extending between the free end portions of its legs, and interconnecting means secured between the legs of the center U-shaped member and the corresponding legs of the other U-shaped member, adjacent the bight portions thereof, of each of said J-shaped members for limiting movement of the bight portions of said U-shaped members away from each other.

2. The combination of claim 1 wherein each of said pivotal securing means includes means for adjusting the position of the axis of rotation of said other U-shaped members relative to said plate whereby they may be placed substantially upon a radius of a tire to which said device is secured and each of said U-shaped members may lie on a radius of that tire.

3. The combination of claim 1 wherein each of said U-shaped members includes means for adjusting the effective length of its bight portion to vary the spacing between its leg portions.

4. An adjustable traction device for vehicle tires comprising a pair of generally J-shaped opposed traction members adapted to embrace diametrically opposite portions of a vehicle tire with the free ends of the longer leg portions thereof disposed on one side of a tire and projecting toward each other, adjustable and coacting securing means on said longer leg portions interconnecting the latter for moving the free end portions of said J-shaped members toward each other to frictionally embrace diametrically opposite portions of a tire, each of said J-shaped members including at least three generally U-shaped members, a mounting plate, means fixedly securing the one free end portion of the center U-shaped member to said plate and means pivotally securing the corresponding end portions of each of the other U-shaped members of each of the U-shaped members to said plate for movement about a selected one of a plurality of axes extending between the free end portions of its legs.

5. The combination of claim 4 wherein each of the axes of rotation of said plurality of axes are fixed relative to the corresponding plate.

6. The combination of claim 4 including interconnecting means secured between the legs of the center U-shaped member and the corresponding legs of the other corresponding U-shaped members.

7. The combination of claim 4 wherein each of said pivotal securing means includes means for adjusting the position of the axes of rotation of said other U-shaped members relative to said plate whereby they may be placed substantially upon a radius of a tire to which said device is secured and each of said U-shaped members may lie on a radius of that tire.

8. The combination of claim 4 wherein said adjustable and coacting securing means includes first guide means on one of said plates and second guide means on the other plate, said guide means being aligned and slidably engaged with each other, said adjustable and coacting securing means also including lever means interconnected between said blades for moving said J-shaped members toward each other.

References Cited in the file of this patent

UNITED STATES PATENTS

| | | |
|---|---|---|
| 2,519,268 | Mattson | Aug. 15, 1950 |
| 2,640,522 | Schroen | June 2, 1953 |
| 2,691,999 | Ziegler | Oct. 19, 1954 |